Patented Oct. 10, 1939

2,175,818

UNITED STATES PATENT OFFICE 2,175,818

BREAKING MINERAL OIL EMULSIONS

Daniel Stryker, White Plains, N. Y., assignor to The Texas Company, New York, N. Y., a corporation of Delaware No Drawing. Application April 15, 1937, Serial No. 137,072

2 Claims. (Cl. 196—4)

This invention relates to the treatment of emulsions of mineral oil and water, such as petroleum emulsions or crude oil emulsions, for the purpose of separating the oil from the water.

Petroleum emulsions are of the water-in-oil type, and comprise fine droplets of naturally occurring waters or brines, dispersed throughout the oil which constitutes the continuous phase of the emulsion. They are obtained from producing wells and from the bottom of oil storage tanks, and are commonly referred to as "roily oil", "emulsified oil", "cut oil" and "bottom settlings". In the production of crude oil from producing wells, the oil is flowed from the well through piping to a settling tank or "gun barrel", where it is maintained in a more or less quiescent state so that the contained water and suspended impurities may settle to the bottom of the tank, the demulsified oil overflowing and passing to regular tankage. The watery layer settled out in this manner is termed B. S. & W., or bottom settlings and water.

The crude oil emulsion produced in many wells is of such a stable character that it will not settle out properly in the gun barrel unless treated with certain chemicals or demulsifying agents. It is of course desirable to remove this water and bottom settlings from the produced oil before passing to regular tankage in order to reduce the volume of liquid stored in tanks and pumped through pipe lines to the refinery, and so that an oil substantially free from water or of a water content reduced below about 2% is obtained for further processing. Various types of demulsifying agents are known for breaking mineral oil emulsions of this character, including water softening compounds, such as sodium carbonate, soaps such as the alkali metal salts of fatty acids, alkali metal sulfonates such as those produced from sulfonated mineral and fatty oils, also demulsifying agents of the modified fatty acid type, the sulfo-aromatic type, the alkylated sulfo-aromatic type, and the like.

The naturally occurring water or brine contained in such emulsified oil often has dissolved therein calcium and magnesium compounds obtained from the oil-bearing strata or adjacent sub-surface. Such calcium and magnesium compounds react with the demulsifying agent, forming calcium and magnesium compounds of that reagent which are ineffective for emulsion breaking purposes. Such reaction therefore consumes a proportionate part of the demulsifying agent and thus impairs the effectiveness of the reagent for the purpose intended.

It is an object of the present invention to provide a method of and composition for breaking mineral oil emulsions of this character which is highly effective, inexpensive, and which minimizes consumption of the demulsifier by inhibiting reaction thereof with calcium and magnesium compounds present in the naturally occurring water or brine of the emulsion.

In accordance with the present invention, there is incorporated with the demulsifying agent a small amount of an alkali metal hexametaphosphate, including such compounds as sodium hexametaphosphate, potassium hexametaphosphate, lithium hexametaphosphate and ammonium hexametaphosphate. The chemical formula usually ascribed to the hexametaphosphates is exemplified by that for the sodium salt $(NaPO_3)_6$. The latter is available commercially in a form which upon solution in water gives an alkaline reaction.

When one of the above metaphosphate compounds is combined with a demulsifying agent, the same is rendered immune to reaction with the calcium and magnesium compounds in the naturally occurring water or brine of the petroleum emulsions, while at the same time the qualities of the demulsifying composition for breaking the emulsion are maintained. The net result is that the whole of the demulsifying agent employed is maintained effective for resolving the oil emulsion and separating it into its constituent parts, and the demulsifying agent is not consumed by reaction with the calcium and magnesium salts. Although I am unable to give a theoretical explanation of this, I believe that the hexametaphosphate compound reacts with the undesirable calcium and magnesium ions, forming complex compounds which are only slightly ionized. Therefore, the more expensive and superior demulsifying agents can be employed in smaller proportion on the basis of the mineral oil emulsion or well fluid treated, securing an economical advantage. Sodium hexametaphosphate is preferred and has the property of segregating the calcium and magnesium ions in substantially non-ionized but water soluble form. Amounts of from .001 to .1% on the basis of the emulsion to be treated are usually sufficient, although larger quantities may be employed if desired.

Any of the conventional demulsifying agents of the character specified above may be employed in accordance with my invention. These agents may be used in the solid form, although they are generally made up into a concentrated solution with a suitable solvent prior to use. Any of the well known solvents may be employed for this purpose, such as water or dilute caustic solution. It is desirable to maintain the emulsion-breaking solution in a slightly alkaline state, for example of a pH from 8.0 to 11.5. If this is not achieved by the particularly demulsifying agent employed, then it is desirable to use in combination with the metaphosphate a buffer salt or a buffer salt mixture. Examples of the latter are alkali metal salts such as sodium carbonate, sodium pyrophosphate and the like, or balanced mixtures of alkali metal hydroxides with alkali metal salts of such acids as boric, phosphoric carbonic, oxalic, silicic, and similar weak acids.

Suitable emulsion-breaking compositions may be prepared in accordance with my invention by mixing the demulsifying agent and the hexametaphosphate in proportions ranging from about 1:1 up to about 10:1, although these may be varied to suit the particular conditions encountered. Sufficient buffer salt or salt mixture may be added to this composition to adjust the alkalinity of the solution formed therefrom within the desired limits as outlined above.

As a specific example, there may be mentioned the addition to the well fluid flowing from a producing well of substantially one part of the sodium salt of mineral oil sulfonic acids to 20,000 parts of well fluid. In addition, substantially one-half part by weight of sodium hexametaphosphate and one-half part of sodium carbonate are added along with the demulsifying agent. Where the hexametaphosphate is not used, consumption of the demulsifying agent, because of reaction with calcium and magnesium salts, may require as much as one part or more of the said demulsifying agent to 5000 parts of well fluid, for effective breaking of the crude oil emulsion. By the use of the metaphosphate in the manner outlined above, as little as one part of demulsifying agent to 30,000 parts or more of well fluid may be successfully employed.

Obviously many modifications and variations of my invention as hereinbefore set forth may be made without departing from the spirit and scope thereof, and therefore only such limitations should be imposed as are indicated in the appended claims.

I claim:

1. The method of breaking a mineral oil emulsion of the water-in-oil type, which comprises subjecting the emulsion to the action of an alkali metal salt of a sulfonated mineral oil and an alkali metal hexametaphosphate.

2. The method of breaking a mineral oil emulsion of the water-in-oil type, which comprises subjecting the emulsion to the action of the sodium salt of mineral oil sulfonic acids and sodium hexametaphosphate.

DANIEL STRYKER.